Aug. 12, 1924.

S. G. CRANE

WEIGHING SCALE

Filed Nov. 21, 1919  6 Sheets-Sheet 1

1,504,609

WITNESSES:
D. C. Walter
C. E. Wilcox

INVENTOR.
Samuel G. Crane
BY George R. Frye
ATTORNEY

Aug. 12, 1924. 1,504,609
S. G. CRANE
WEIGHING SCALE
Filed Nov. 21, 1919 6 Sheets-Sheet 2
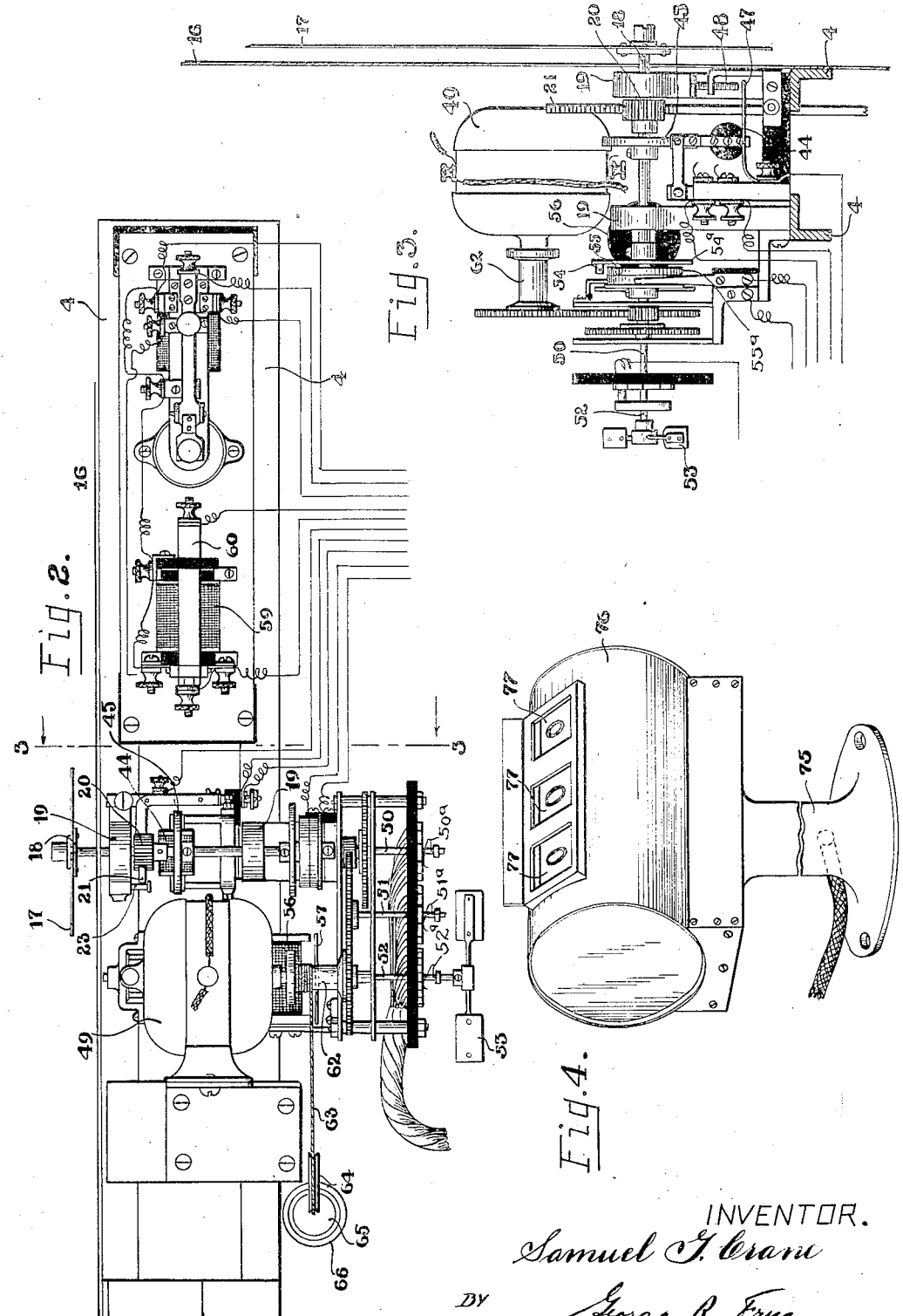
INVENTOR.
Samuel G. Crane
BY
George R. Frye
ATTORNEY Aug. 12, 1924.
S. G. CRANE
WEIGHING SCALE
Filed Nov. 21, 1919
1,504,609
6 Sheets-Sheet 3
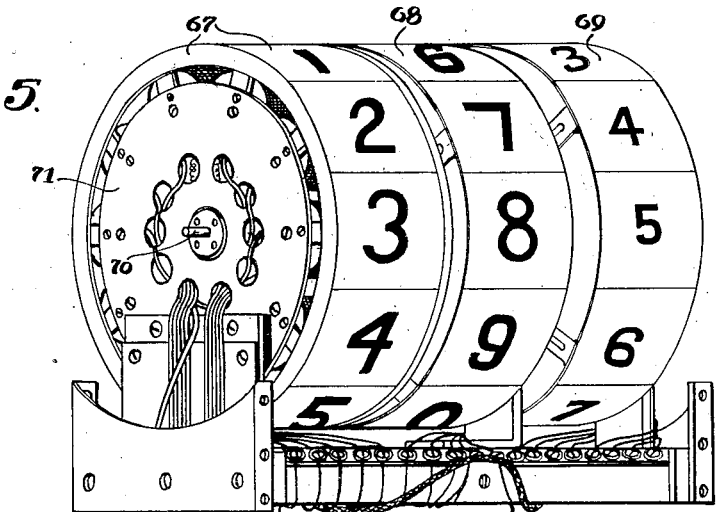
Fig. 5.
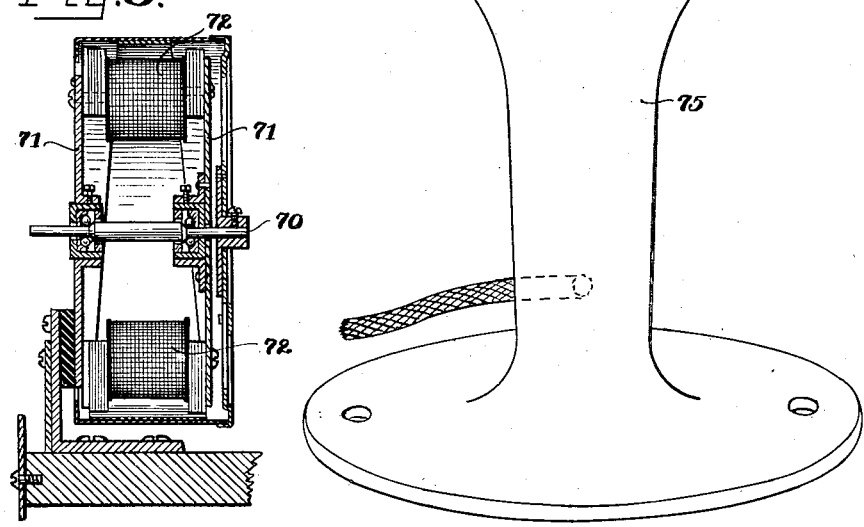
Fig. 6.
Fig. 7.
WITNESSES:
C. E. Wilcox
B. D. Marshall
INVENTOR.
Samuel G. Crane
George R. Frye
ATTORNEY.

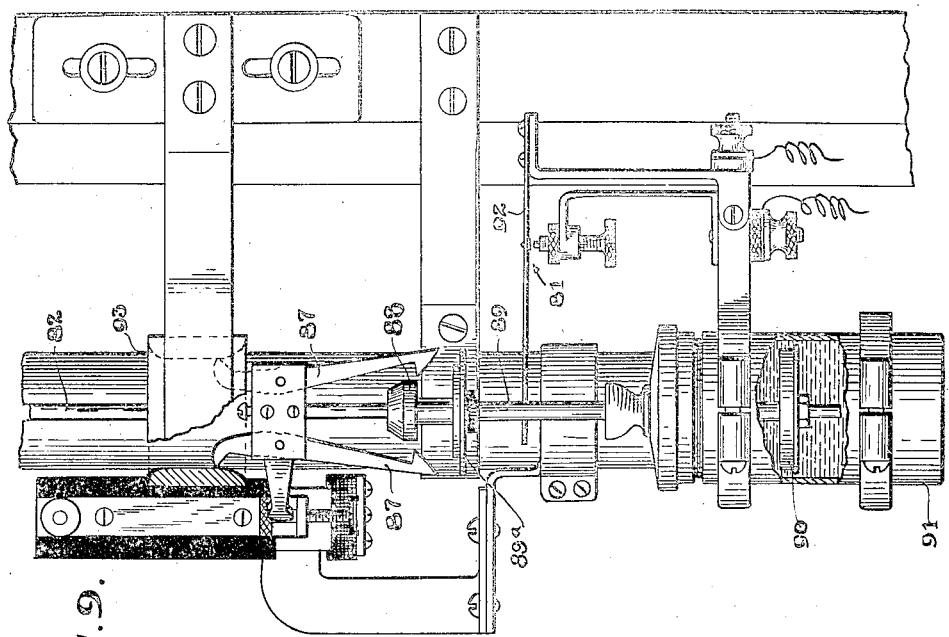

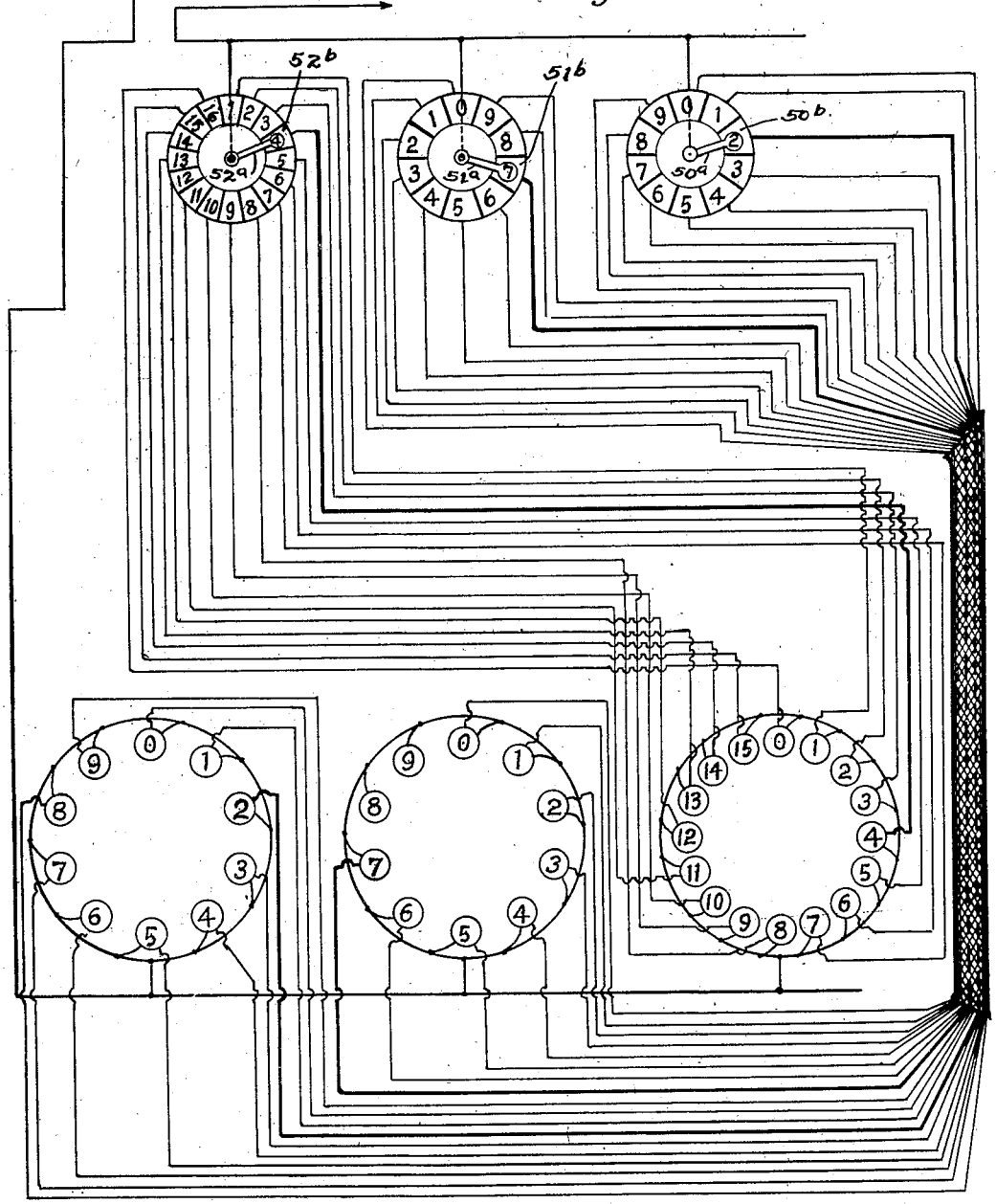

Aug. 12, 1924.

S. G. CRANE

WEIGHING SCALE

Filed Nov. 21, 1919

Inventor
Samuel G. Crane
By George R. Frye
Attorney

Patented Aug. 12, 1924.

1,504,609

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed November 21, 1919. Serial No. 339,687.

*To all whom it may concern:*

Be it known that I, SAMUEL G. CRANE, a citizen of the United States, residing at Toledo, in the county of Lucas and State of Ohio, have invented certain new and useful Improvements in Weighing Scales, of which the following is a specification.

This invention relates to weighing scales and indicating mechanism adapted to be used therewith, though not limited to such use, and some of its principal objects are to provide a simple and efficient target indicator adapted to be operated from an extraneous source of power; to so connect such an indicator to a weighing scale that it may be operated therefrom while located at a distance; to provide means for operating such an indicator so arranged as to be actuated from the scale without affecting the weighing operations thereof; to provide means for actuating an indicator controlling device which is operative after the scale comes to rest in weighing position; and to so construct a weighing scale that it may be thrown slightly out of level without injuriously affecting its accuracy.

Other objects and advantages will be apparent from the following description, in which reference is had to the accompanying drawings illustrating a preferred embodiment of my invention and in which similar reference numerals designate similar parts throughout the several views.

In the drawings:—

Figure 2 is a plan view of part of the mechanism for controlling a distant indicator;

Figure 3 is a sectional elevational view on the line 3—3 of Figure 2;

Figure 4 is a perspective view of an indicator adapted to be operated by the scale while located at a distance therefrom;

Figure 5 is an enlarged perspective view of the indicator with the casing removed;

Figure 6 is a vertical diametral view of one of the indicator reels and the frame carrying actuating mechanism therefor;

Figure 7 is a perspective view of one of the indicator reels showing a tapered armature for operating the same;

Figure 8 is an elevational view, partly in section, of a part of the controlling and resetting mechanism;

Figure 9 is an elevational view taken at right angles to Figure 8;

Figure 10 is a diagram of the distant indicator controls and wiring; and

Figure 1:
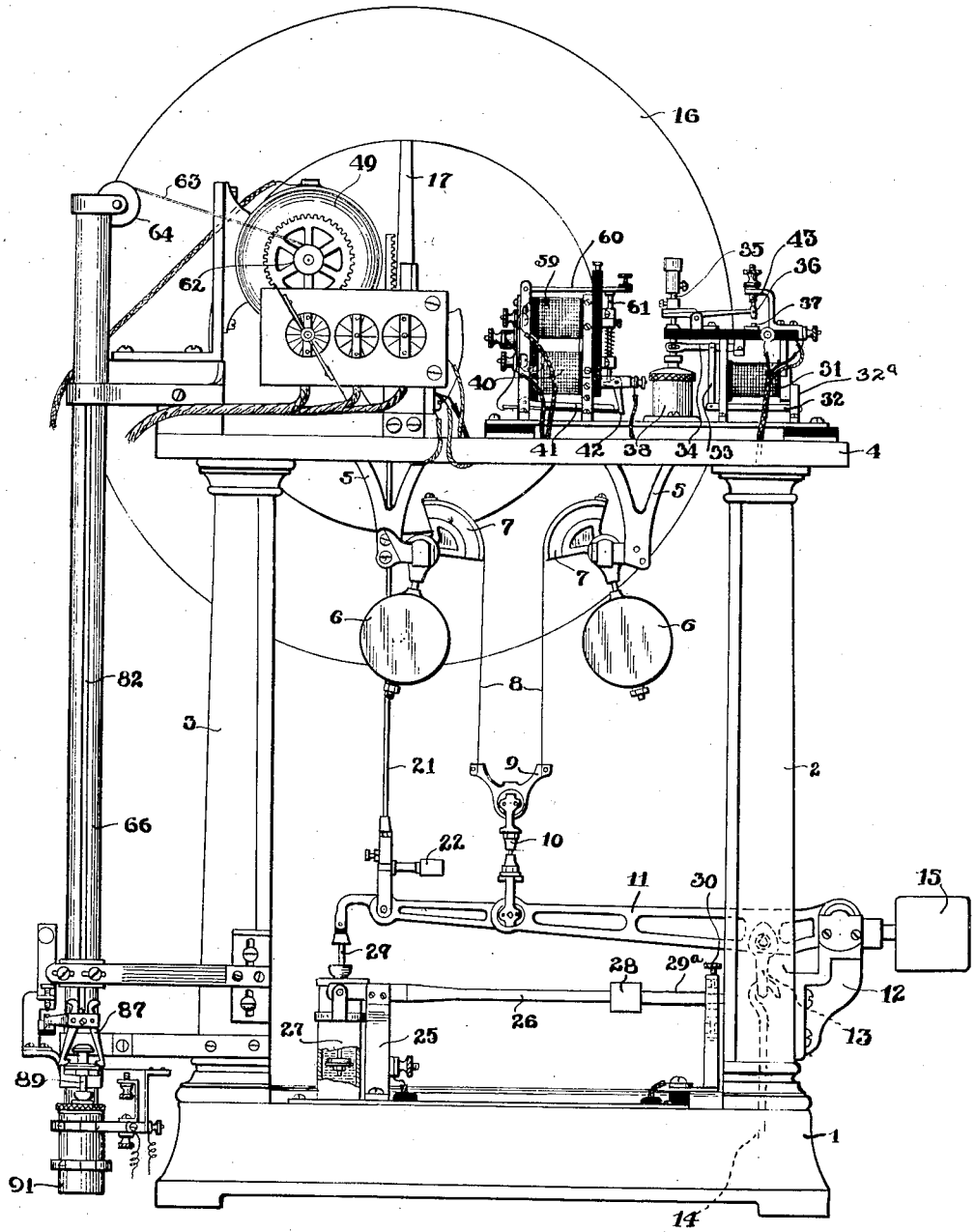
Figure 1 is a rear elevation of a scale embodying certain features of my invention.
Figure 11:
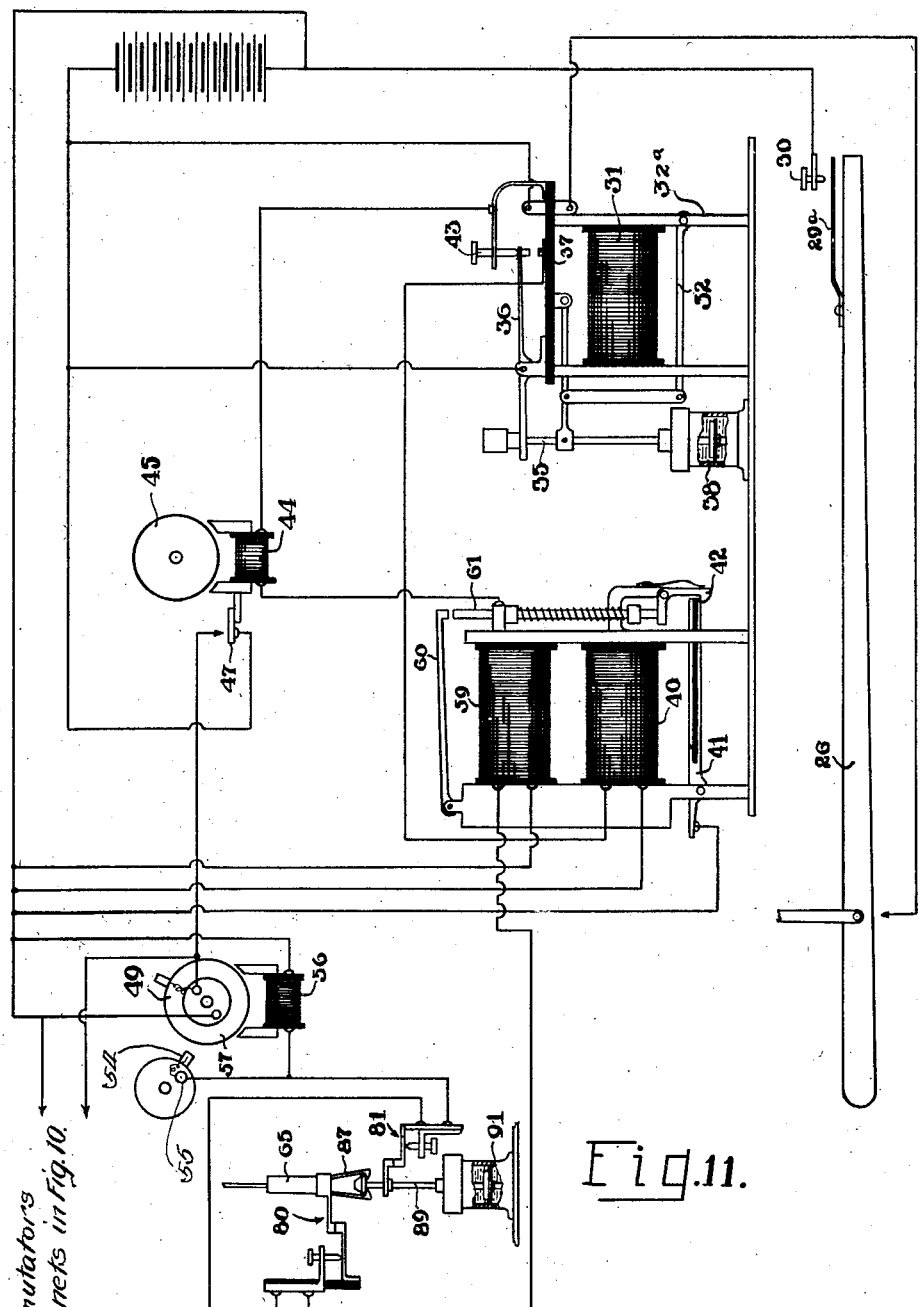
Figure 11 is a diagrammatic view of the electric indicator controlling mechanism and wiring.

Referring to the drawings in detail, the base 1 of the scale is in the form of a housing and encloses the platform lever mechanism, which is not illustrated, as the operation of the scale is not dependent upon any particular arrangement of platform levers.

Supported upon the base 1 is a frame comprising uprights 2 and 3 and angle iron crossbars 4 connecting the upper ends of the uprights and having a pair of brackets 5 depending therefrom for the purpose of supporting oppositely-swinging load-offsetting pendulums 6.

Each of the pendulums 6 is provided with a power sector 7 to which is secured the upper end of a flexible steel band or ribbon 8, the ribbon taking over the curved face of the power sector and thence extending downwardly to an equalizer 9. The equalizer 9 is pivotally connected to the upper end of an adjustable link 10, the lower end of the link being pivotally connected to a lever 11. The lever 11 is fulcrumed preferably upon knife edge pivots upon the upper end of a bracket 12 secured to the standard 2, and carries a pivoted stirrup 13 into which is hooked the upper end of a hook rod 14 leading to the platform lever mechanism of the scale. An adjustable weight 15 carried by the lever 11 may be moved toward or away from the fulcrum to vary the initial pull upon the ribbons 8.

When a load is placed upon the scale the hook rod 14 is pulled downwardly, thereby rocking the lever 11 on its fulcrum, increasing the pull upon the ribbons 8 and swinging the pendulums outwardly to positions in which the load on the scale is offset or counterbalanced. Since the pendulums swing oppositely the scale will weigh correctly even though it be slightly out of level, for while raising one side of the scale increases the angle of the adjacent pendulum to the vertical, the angle of the other pendulum is decreased an equal degree, and the increase in the pull exerted by one of the ribbons 8 upon the link 10 is neutralized by the decrease in the pull upon the other ribbon.

For the purpose of indicating the weight of the load upon the platform a circular dial 16 is secured to the forward crossbar 4 and an indicator hand 17 is arranged to swing thereover. The indicator hand 17 is fixed to a shaft 18 which is journalled, preferably on ball bearings, in short standards 19 secured upon the crossbars 4. A pinion 20 is fixed upon the shaft 18 intermediate the standards 19 and meshes with a rack 21, the lower end of which is connected to the lever 11. In order to lightly hold the rack in mesh with the pinion it is provided near its foot with a weighted arm 22 which tends to swing it about its pivot on the lever 11 and thereby holds it against the pinion. A guard 23 projecting from the forward standard 19 and normally out of contact with the rack prevent the rack from swinging out of place when the scale is moved or subjected to shocks.

When the hook rod 14 is pulled downwardly the lever 11 is rocked on its fulcrum and the rack 21 moves downwardly, rotating the pinion 20 and swinging the indicator hand 17 over the chart, the parts being brought to rest when the pendulums 6 have reached positions in which the load is counterbalanced.

The scale illustrated in the drawings is designed to weigh loads ranging to 100 lbs. in weight, but it is to be understood that the particular scale and indicating mechanism illustrated are shown for the purpose of exemplification only and changes in the numbers and proportions of the parts may be made as desired to increase or decrease the capacity of the scale and indicator. The chart 16 is in any case properly graduated for the hand 17 to indicate the weight of the load on the scale.

The indication on the chart 16 can only be read, however, by those near the scale. In order to indicate the weight at one or more distant points I have provided an electrically-operated indicating device, one or more of which may be located in offices or at other convenient places away from the scale.

The mechanism for operating the distant indicator is set in motion by the closing of a dash pot controlled switch which will now be described. Pivoted upon a short fulcrum stand 25 secured to the base 1 is a lever 26, one arm of which carries a dash pot 27 containing a fluid of suitable vicosity. The other lever arm carries a weight 28 which slightly over-balances the lever so that the dash pot is normally held in elevated position. The dash pot plunger is connected by means of a plunger rod 29 to the lever 11. When the lever is pulled downwardly the plunger acting through the fluid in the dash pot forces the dash pot downwardly, thereby raising the arm of the lever 26 which carries the weight 28. The weighted end of the lever 26 also carries a resilient contact member $29^a$ adapted to engage a contact screw 30 when the dash pot is depressed. As long as the weighing mechanism of the scale continues to vibrate the lever 26 continues to rock and the contact strip $29^a$ is repeatedly carried against the contact screw 30. When the weighing mechanism of the scale comes to rest the weighted end of the lever 26 settles and the strip $29^a$ remains out of engagement with the contact screw 30 until the next operation of the weighing mechanism.

Engagement of the strip $29^a$ and contact screw 30 closes an electric circuit which energizes a magnet 31 and thereby raises its armature 32. One end of the armature 32 is pivoted to a stationary support $32^a$ and its other end is connected through a link 33 and lever 34 to a weighted plunger rod 35. The weighted plunger rod 35 presses upon an over-weighted lever 36 and normally holds it out of engagement with the contact 37. When, however, the plunger rod 35 is elevated the contact lever 36 falls into engagement with the contact 37. Engagement of the lever 36 with the contact 37 closes a circuit which energizes a magnet 40 and raises its pivoted armature 41. When the armature 41 has thus been raised it is held in elevated position by means of a pivoted catch 42. The armature 41 and the catch 42 form a connection or bridge in one of the circuits to be hereinafter described, and until the armature is elevated this circuit is not closed, though it contains another switch.

While the weighing mechanism of the scale is in vibration the magnet 31 is repeatedly energized and the plunger rod 35 is repeatedly elevated. When the weighing mechanism comes to rest the plunger settles in the dash pot 38 and the lever 36 is raised into engagement with the contact 43. Engagement of the lever 36 and contact 43 after the scale comes to rest closes a circuit of which the armature 41 and catch 42 are a part and which energizes a magnet 44 located below the indicator shaft 18. The magnet 44 is pivotally mounted upon the frame of the scale by means of a resilient member and when energized springs into engagement with a soft iron disc 45 fixed to the indicator shaft and thereby locks the indicating mechanism against further movement.

Forming an extension of the resilient member which supports the magnet 44 and adapted to be raised with it is a contact member 47 which when the magnet rises engages the contact screw 48 and thereby closes a circuit which operates a motor 49. The motor shaft is geared to a set of commutator shafts 50, 51 and 52, the gear ratio between the shafts 50 and 51 being 1:10 and the gear ratio between the shafts 50 and 52 being 1:16. Fixed upon the shaft 52 is a fan 53 which serves to retard and steady the movement of the commutator.

The shaft 50 is in alignment with the indicator shaft 18. Contacts 54 and 55 are carried by discs 54$^a$ and 55$^a$ fixed respectively upon the indicator shaft 18 and the commutator shaft 50 and so located as to come into engagement when the rotative movement of the commutator shaft as it is turned by the motor equals the rotative movement previously made by the indicator shaft as it was turned by the rack 21. Engagement of the contacts 54 and 55 closes a circuit which energizes a magnet 56, causing it to magnetically clutch a soft iron disc 57 fixed upon the commutator shaft 52, this being the shaft of greatest movement. By so clutching this disc the motor and commutator are instantly stopped and the device is prevented from overrunning.

Wired in parallel with the magnet 56 so as to also be energized upon engagement of the contacts 54 and 55 is a magnet 59 situated above the magnet 40. The armature 60 is pivoted above the magnet 59 and is normally held in elevated position by means of a spring-pressed plunger rod 61. When, however, the magnet is energized the armature is drawn downwardly, forcing down the plunger rod 61. The lower end of the plunger rod rests upon an arm of the catch 42, and when the rod is forced downwardly the catch is released and the armature 41 falls, thereby breaking the circuit which raises the pivoted magnet 44 and attached contact strip 47. The indicator hand 17 is then free and the contact between the strip 47 and screw 48 is broken. By thus breaking the contact between the strip 47 and screw 48 the current is cut out of the motor.

The current which energizes the magnets 56 and 59 passes through the strip 47 so that when the magnet 44 falls these magnets are de-energized, the commutator is free to return to its original position, and the catch 42 is again in position to engage the armature 41 during the next weighing operation.

For the purpose of returning the commutator to its initial position the motor shaft is provided with a spool or winding drum 62, upon which is wound a cord 63 passing over a pulley 64 and supporting a bob 65. The bob 65 hangs within a vertical tube 66, the upper end of which supports the pulley 64. When the current is cut out of the motor and the clutch holding the commutator is released the bob descends in the tube, turning the motor backwardly until the commutator is at zero position, the cord 63 being of such length that when the commutator is at zero the cord is completely unwound.

The device for indicating at a distance the weight upon the scale (illustrated in Figures 4, 5, 6 and 7) constitutes an important feature of my invention. In the form shown it comprises a plurality of reels 67, 68 and 69 and electric means for positioning them. The reel 67 bears numerals ranging from 0 to 9 and is adapted to indicate tens of pounds. The reel 68 bears numerals ranging from 0 to 9 and is adapted to indicate units of pounds. The reel 69 bears numerals from 0 to 15 and is adapted to indicate ounces. The reels are fixed upon shafts 70 journalled in ball bearings in stationary frames each consisting of a pair of plates 71. Mounted between the plates 71 and spaced at intervals about the peripheries thereof is a plurality of small magnets 72, there being ten magnets in the set for each of the reels 67 and 68 and sixteen magnets in the set for the reel 69.

An annular strip of soft iron 73 widened at one portion and tapering both ways from the widened portion to an opposite narrowed portion is fixed upon the inner periphery of each of the reels (see Figure 7). When one of the magnets within the reel is energized the reel turns about its axis until the widened part of the strip is adjacent the active magnet. Each of the said magnets is in circuit with a stationary contact 50$^b$, 51$^b$ or 52$^b$ of the motor-operated commutator and with a brush 50$^a$, 51$^a$ or 52$^a$ carried by the corresponding commutator shaft, as is diagrammatically shown in Figure 10. In order that the current may be cut out of all the indicator magnets when the motor is idle they are wired in parallel with the motor. When the commutator shafts turn the current is switched successively into the magnets operating each reel. The reels quickly turn until the wide portions of the strips 73 are in proximity to the active magnets and as the current switches from magnet to magnet the reels turn accordingly. When the current is cut out of the motor it is also cut out of the indicator magnets and the reels remain in the positions finally taken until again actuated.

The indicating reels and magnets are supported upon a stand 75 and are covered by a casing 76 having a window 77 for each reel therein. The numerals on the reels are so arranged that as the commutator shafts turn, the numerals up to and including those indicating the weight of the load are successively displayed at the windows. While I have shown a device of three reels, it is obvious that more or less may be used, as convenience requires. In scales of small capacity the complete weight range may be carried by one reel. For scales of greater capacity additional reels may be added.

In weighing very light loads the commutator turns very quickly to the position in which the contacts 54 and 55 (carried by the indicator shaft 18 and the commutator shaft 50) are in engagement. To prevent any possibility of the current being cut out of the motor and commutator before the distant indicator reels have come into synchronous action with the commutator I have placed two serially connected switches 80 and 81 in circuit with the contacts 54 and 55 and magnet 59. These switches are placed at the lower end of the tube 66 and are most clearly shown in Figures 8 and 9. The tube 66 is slotted, as at 82, and an arm 83 rigid with the bob 65 projects from the slot and carries a curved finger 84. The switch 80 consists of a resilient member 85 which normally engages the contact screw 86. When the bob 65 is in lowermost position the finger 83 presses upon the resilient member 85 and holds the switch open. The arm 83 also carries a pair of pivoted pawls 87 which when the bob is in its lowermost position grasps the head 88 of the plunger rod 89. The plunger rod 89 carries a plunger 90 operating in a dash pot 91. The rod 89 is provided with a collar 89ª which when the plunger is depressed presses down upon a resilient member 92 of the switch 81 and holds the switch closed. When the motor begins to turn and the bob 65 starts upwardly the pawls 87 raise the plunger allowing the switch 81 to open. After the plunger has been raised a short distance the pawls engage cam surfaces 93 in the bracket 94 attached to the tube 66 (see Figure 9) and the head 88 is released so that the plunger may settle. Immediately after the switch 81 opens, the switch 80, which is in circuit therewith, is allowed to close. When, therefore, the dash pot plunger settles and flexes the strip 92, both switches are closed and the magnet 59 will operate to cut the current out of the motor and commutator when the contacts 54 and 55 engage. If, however, the load is very light and the motor is only operated a short time, the current will remain on the commutator and distant indicator as well as the motor, the motor being stopped at the proper moment, however, by the clutch 56, until the plunger 90 settles and the switch 81 is closed, thus allowing time for the distant indicator reels to come to positions corresponding to that of the commutator.

I have shown my indicating mechanism in combination with a pendulum scale which itself is in some respects novel. The indicating machine is, however, equally adapted for use with other types of automatic scales.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a scale, in combination, weighing mechanism, indicating mechanism, a circuit having a normally closed and a normally open switch therein, means controlled by the vibration of said weighing mechanism to open said closed switch and close said open switch, means controlled by cessation of vibration of said weighing mechanism to again close said normally closed switch thereby closing said circuit, and means actuated by the closure of said circuit for operating said indicating mechanism.

2. In a scale, in combination, weighing mechanism, indicating mechanism, a circuit having a normally closed and a normally open switch therein, means controlled by the vibration of said weighing mechanism to open said closed switch and close said open switch, means controlled by cessation of vibration of said weighing mechanism to again close said normally closed switch, thereby closing said circuit, means actuated by the closure of said circuit for locking said weighing mechanism and closing a second circuit, and means actuated by closure of said second circuit for actuating said indicating mechanism.

3. In a device of the class described, in combination, weighing mechanism, a shaft connected to said weighing mechanism to be rotated thereby, a motor, means controlled by movement of said weighing mechanism for operating said motor, an indicator, means for stopping said motor after movement proportional to the movement of said shaft, connections between said motor and said indicator for moving said indicator to a position corresponding to that of said shaft, means for deactivating the connections between said motor and said indicator upon stopping of said motor, and means for imparting a reverse movement to said motor equal to its previous forward movement.

4. In a device of the class described, weighing mechanism, a shaft connected to said weighing mechanism to be rotated thereby, a motor, means controlled by movement of said weighing mechanism for operating said motor, a commutator geared to said motor, an indicator, connections between said commutator and said indicator for moving said indicator proportionally to the movement of said commutator, and means for stopping said motor after movement proportional to the movement of said shaft.

5. In a device of the class described, weighing mechanism, a shaft connected to said weighing mechanism to be rotated thereby, a motor, means controlled by moveerating said motor, a commutator geared to said motor, an indicator, connections between said commutator and said indicator for moving said indicator proportionally to the movement of said commutator, means for stopping said motor after movement proportional to the movement of said shaft, and means for de-activating the connections between said commutator and said indicator upon the stopping of said motor.

SAMUEL G. CRANE.

Witnesses:
C. O. MARSHALL,
C. E. WILCOX.